United States Patent
Hopcraft

(10) Patent No.: US 10,425,913 B2
(45) Date of Patent: Sep. 24, 2019

(54) AUTOMATED EQUIPMENT CHARACTERIZATION FROM WIRELESS NETWORK DATA

(71) Applicant: Tektronix, Inc., Beaverton, OR (US)

(72) Inventor: Geoff Hopcraft, Piedmont, CA (US)

(73) Assignee: Netscout Systems Texas, LLC, Westford, MA (US)

( * ) Notice: Subject to any disclaimer, the term of this patent is extended or adjusted under 35 U.S.C. 154(b) by 209 days.

(21) Appl. No.: 14/621,096

(22) Filed: Feb. 12, 2015

(65) Prior Publication Data

US 2016/0242140 A1  Aug. 18, 2016

(51) Int. Cl.
*H04W 64/00* (2009.01)
*H04W 24/04* (2009.01)

(52) U.S. Cl.
CPC .......... *H04W 64/003* (2013.01); *H04W 24/04* (2013.01)

(58) Field of Classification Search
CPC .. H04W 64/006; H04W 24/04; H04W 64/003
See application file for complete search history.

(56) References Cited

U.S. PATENT DOCUMENTS

| | | | | |
|---|---|---|---|---|
| 7,962,790 B2* | 6/2011 | Son | ...................... | G06F 11/0736 714/26 |
| 8,315,623 B1* | 11/2012 | Flynn | ..................... | H04W 24/04 455/405 |
| 2012/0155428 A1* | 6/2012 | Bovo | .................... | H04W 12/02 370/331 |
| 2015/0023174 A1* | 1/2015 | Dasgupta | ............ | H04W 40/248 370/236 |
| 2015/0120901 A1* | 4/2015 | Baumgartner | ........ | H04W 24/00 709/224 |
| 2016/0004624 A1* | 1/2016 | Zachrison | ............. | H04W 24/08 717/127 |
| 2016/0254944 A1* | 9/2016 | Larsson | ................ | H04W 24/04 370/230 |

\* cited by examiner

*Primary Examiner* — Mazda Sabouri

(74) *Attorney, Agent, or Firm* — Locke Lord LLP; Scott D. Wofsy; Christopher J. Capelli

(57) ABSTRACT

A system for detecting a faulty behavior of a User Equipment (UE) in a telecommunication network is provided. A trouble report information associated with a first UE is received. The trouble report includes information uniquely identifying the first UE and information indicative of trouble affecting the first UE. One or more geographic locations for each communication session associated with the first UE for a predetermined period of time are established. Performance metrics associated with the first UE are compared with performance metrics associated with a plurality of UEs. The plurality of UEs includes UEs that handled communication sessions at similar times and locations. The first UE is characterized based on the comparison.

15 Claims, 3 Drawing Sheets

AUTOMATED EQUIPMENT CHARACTERIZATION FROM WIRELESS NETWORK DATA

FIELD OF THE INVENTION

This specification is directed, in general, to telecommunication networks, and, more particularly, to automated equipment characterization from wireless network data.

BACKGROUND OF THE INVENTION

In today's highly competitive telecommunications industry, service providers provide customers (subscribers) with a wide variety of voice, data, video, and internet services. Because of the complexity of service provider network systems and network equipment being deployed in the field to provide such services, service providers must utilize highly trained technicians to install and fix problems encountered by subscribers.

Typically, service providers utilize call centers that have trained personnel to answer calls from subscribers, to perform the analysis of the problem and to provide a proposed solution. Due to the complexity of the systems involved, such call centers may receive a very large number of support calls from subscribers or technicians in the field. Typically, the trained personnel answering the calls begin troubleshooting by performing triage in order to determine, for example, whether the reported problem is related to either radio or core network, whether the problem is subscriber specific or systemic to a subset of subscribers, and so on. After performing the triage the trained support personnel usually apply their empirical knowledge to ascertain possible root causes of the reported problems and to assist with resolution of such problems. However, such calls can be costly in terms of time and resources needed to train the personnel answering the calls from subscribers, and in terms of the time and resources utilized by employing such trained personnel.

Accordingly, it would be advantageous to provide a more efficient troubleshooting process in various telecommunication networks.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for detecting a faulty behavior of a User Equipment (UE) in a telecommunication network is provided. A trouble report information associated with a first UE is received. The trouble report includes information uniquely identifying the first UE and information indicative of trouble affecting the first UE. One or more geographic locations for each communication session associated with the first UE for a predetermined period of time are established. Performance metrics associated with the first UE are compared with performance metrics associated with a plurality of UEs. The plurality of UEs includes UEs that handled communication sessions at similar times and locations. The first UE is characterized based on the comparison.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
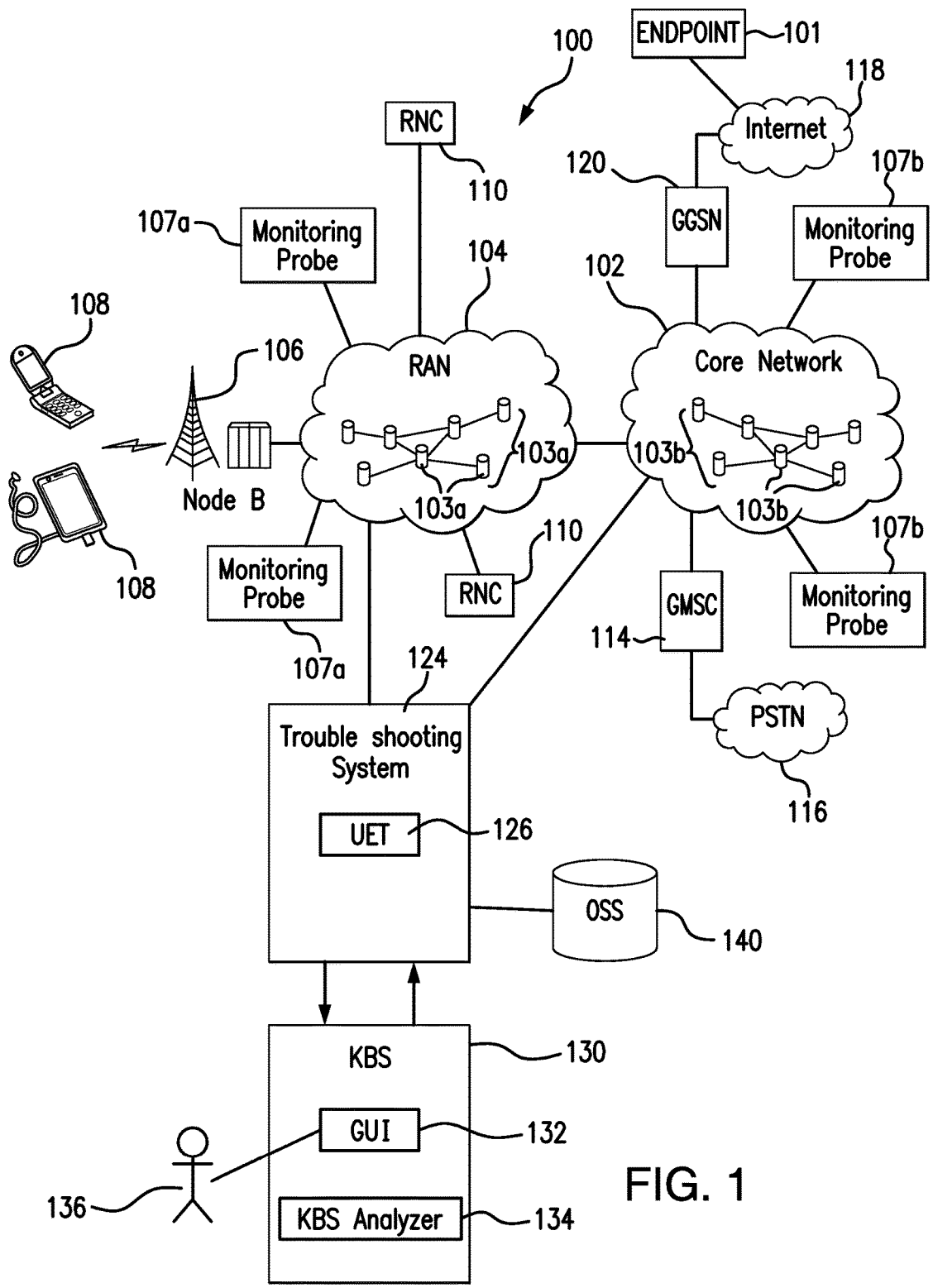
FIG. 1 illustrates an example communication network in accordance with an illustrated embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 illustrates a block diagram of a network monitoring environment according to some embodiments. For example, network 100 may include a wireless broadband network, a 3G network, a 4G network, a 3GPP Long Term Evolution (LTE) network, etc. Various embodiments of the present invention will now be described, by way of example only, and with reference to Universal Mobile Telecommunications Systems (UMTS) network 100 architecture in accordance with current Third Generation Partnership Project (3GPP) and Third Generation Partnership Project 2 (3GPP2) specifications. The illustrated UMTS network 100 architecture includes a core network 102 interconnected with a Radio Access Network (RAN) 104 via an interface known as Iu which is defined in detail in the current publicly available 3GPP specification documents.

The RAN 104 is configured to provide wireless telecommunication services to users through UEs 108 via a radio interface known as UU. The RAN 104 has base stations, known as NodeBs 106 in 3GPP, which collectively provide for the geographic coverage for wireless communications with UEs 108. In the RAN 104, groups of one or more NodeBs 106 are connected to a Radio Network Controller (RNC) 110 via an interface known as Iub in 3GPP. The RAN 104 may have several groups of NodeBs 106 connected to different RNCs 110; two are shown in the example depicted in FIG. 1. Where more than one RNC 110 is provided in a RAN, inter-RNC 110 communications are preferably performed via the Iub interface. It is noted, while the embodiments are described herein with reference to UMTS network 100 architecture and Iub protocol, the description herein is not so limited, and may be applied to a variety of interfaces including, but not limited to, Common Public Radio Interface (CPRI).

Under current 3GPP specifications, the core network 102, and preferably not the RAN 104, is configured with connectivity to external systems such as Public Land Mobile Networks (PLMN), Public Switch Telephone Networks (PSTN) 116, Integrated Services Digital Network (ISDN) and other Real Time (RT) services via an RT service interface. Core network 102 will also support Non-Real Time (NRT) services with the Internet 118. Under current 3GPP specifications, the core network 102 provides RT service external connectivity via a Gateway Mobile Switching Center (GMSC) 114. The core network 102 preferably provides NRT service, known as General Packet Radio Service (GPRS), external connectivity via a Gateway GPRS Support Node (GGSN) 120. In this context, a particular NRT service may actually appear to a user to be a real time communication due to the communication speed and associated buffering of the Time Division Duplex (TDD) data packets forming the communication. One example of this is voice communication via the Internet 118 which can appear to the user as a normal telephone call conducted by a switching network, but is actually being conducted using an Internet Protocol (IP) connection which provides packet data service.

Still referring to FIG. 1, many packets traverse communicatively coupled core network elements 103b and RAN network elements 103a (hereinafter collectively referred to as "network elements 103"), as calls and data are exchanged between UEs 108 and endpoints 101 (e.g., border elements, application servers, or the like). These packets may represent many different sessions and protocols. For example, if UE 108 is used for a voice or video call, then it may exchange Voice over Internet Protocol (VoIP) or Session Initiation Protocol (SIP) data packets with a SIP/VoIP server (i.e., the endpoint 101) using Real-Time Transport Protocol (RTP). If endpoint 101 is used to send or retrieve email, UE device 108 may exchange Internet Message Access Protocol (IMAP), Post Office Protocol 3 Protocol (POP3), or Simple Mail Transfer Protocol (SMTP) messages with an email server (i.e., the endpoint 101). If endpoint 101 is used to download or stream video, UE 108 may use Real Time Streaming Protocol (RTSP) to establish and control media sessions with a video server (i.e., the other endpoint not shown in FIG. 1). In some cases, communications may be had using the GPRS Tunneling Protocol (GTP).

As the complexity of telecommunications networks continues to grow, the level of required reliability and availability of the networks continues to rise correspondingly. These factors place an increasing burden on diagnostic and troubleshooting systems that are used to isolate and correct network and UE problems. For network service providers, quick and accurate problem diagnosis and correction is critically important aspect. Furthermore, quality monitoring is another important aspect for service providers. In a wireless telecommunications network, such as UMTS network 100, Quality of Experience (QoE) is a measure of a customer's experiences using mobile services. QoE takes into account the needs and the desires of the subscribers when using a mobile service.

Advantageously, various embodiments of the present invention contemplate a monitoring and troubleshooting system that efficiently and accurately evaluates session records, performance and configuration data of RAN 104 to determine whether a subscriber's complaint is valid and whether subscriber's UE is defective and automatically applies procedural and iterative root cause analysis to provide recommendations for resolving the reported network or UE failures. According to an embodiment of the present invention, a troubleshooting system 124 may include, but not limited to, a computer server operatively coupled to each segment of UMTS network 100 and to a operations support systems (OSS) platform (interchangeably referred to herein as the "network management platform"). At the highest level, the network management platform provides the computer resources required to perform various network management functions, such as billing, customer care, network management, inventory control, maintenance, trouble ticket reporting, surveillance and service provisioning. In some embodiments, the network management platform comprises a plurality of applications, such as performance, fault, configuration and security management applications. As shown in FIG. 1, troubleshooting system 124 may communicate with data repository maintained by the network management platform, such as, but not limited to OSS database 140.

A session, call, or data record is created for each UE 108 using messages, signals, and/or data collected or intercepted by monitoring probes 107 from various network interfaces. A monitoring system, such as monitoring probes 107 and monitoring server (not shown in FIG. 1), may be coupled to interfaces and links in the network to passively monitor and collect signaling data from one or more interfaces in the network. The monitoring system may collect user plane and control plane data from the interfaces. The monitoring probes 107, may comprise, for example, one or more processors running one or more software applications that collect, correlate and analyze Protocol Data Units (PDU) and data packets from both RAN 104 and core 102 network interfaces and links. Probes 107 and/or the monitoring server may correlate the information captured on different interfaces and associate it with a particular UE 108. All collected data may be stored in OSS database 140.

As shown in FIG. 1, troubleshooting system 124 may be communicatively connected to both the core network 102 and RAN 104. In an embodiment of the present invention, troubleshooting system 124 may comprise, or otherwise may cooperate with a User Equipment Troubleshooting (UET) software program 126. UET program 126 may comprise program instructions stored on one or more computer-readable storage devices, which may include internal storage on the troubleshooting system 124. A plurality of communication sessions including voice calls, voice mails, chat sessions, data transfer sessions, Voice-over-IP (VoIP) and video communication (including video mail) and streaming audio and video sessions, such as, but not limited to, interactive video conferencing sessions may be transmitted across UMTS network 100. UET 126 may be, for example, a computer program or program component capable of automatically determining, based on session records and other wireless data stored in OSS database 140, whether reported troubles affecting subscriber's UE are caused by faulty UE or other network-related issues and capable of performing root cause analysis of the reported issues to provide certain information, such as countermeasures (corrective actions) for resolving the reported troubles. Operational steps of UET 126 program are described in more detail below.

According to an embodiment of the present invention, UET 126 may be capable of providing resolution recommendations for a plurality of detected network failures by communicating with a knowledge base system (KBS) 130 which may be stored on one or more computer-readable storage devices. In one embodiment, KBS 130 may be designed to apply formal representations of domain knowledge or expertise to solve network related problems. Symbolic descriptions (e.g., in the form of rules, frames, predicate logic, etc.) of this expertise characterize the definitional and empirical relationships in a domain. This approach of knowledge models has been found advantageous in automating troubleshooting tasks that may become too complex to be accomplished by human experts. As shown in FIG. 1, KBS 130 may be communicatively connected to troubleshooting system 124. In an embodiment of the present invention, KBS 130 may comprise, or otherwise may cooperate with a KBS analyzer software program 134. KBS analyzer 134 may comprise program instructions stored on one or more computer-readable storage devices, which may include internal storage on the knowledge base system 130. KBS analyzer 134 may be, for example, a computer program or program component utilized as the inference engine of knowledge base system 130 that matches the current inputs to relevant elements in knowledge base 130. In some embodiments, KBS analyzer 134 may provide the means to re-assess the state of a situation during each cycle of a reasoning mechanism. As a result, KBS analyzer 134 may be capable of reacting to a dynamic situation more readily than conventional programs.

Additionally, KBS 130 may include a user interface, such as graphical user interface (GUI) 132 program. In one embodiment, GUI 132 may comprise a framework for collecting user feedback from various users 136, such as network technicians, with respect to the actual causes of the reported network issues and with respect to recommended countermeasures. This historical information may be incorporated into the root cause analysis to provide more accurate recommendations as described in more detail below.

It is noted that the UE 108 is depicted in FIG. 1 as a mobile wireless device such as a cell phone or smart phone. However, it may be any portable device, such as a laptop, notebook, tablet computer, palm-sized computer, or any electronic device with capability to receive communication (i.e. wireless) signals.

Those skilled in the art will understand that any number of nodes, devices, links, etc. may be used in the computer network, and that the view shown herein is for simplicity. Also, while the embodiments are shown herein with reference to UMTS network 100 architecture, the description herein is not so limited. For purposes of the present patent application, the RAN 104 may be implemented in any combination of known or heretofore unknown radio access technology and network protocols. For instance, the RAN 104 may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, Device to Device (D-D), etc. The RAN 104—can also be an aggregation of channels from multiple bands in the radio access technology LTE-A (Long Term Evolution—Advanced), also known as fourth generation (4G) networks. LTE-A is a set of enhancements to the UMTS that includes an all-IP networking architecture and the ability of each NodeB 106 to connect to multiple core networks. The RAN 104 depicted in FIG. 1 includes one or more NodeBs 106, each NodeB 106 providing wireless access to a respective service coverage region. In alternative embodiments, the RAN 104 may include other types of access points that include relays, femtocells and picocells.

Figure 2:
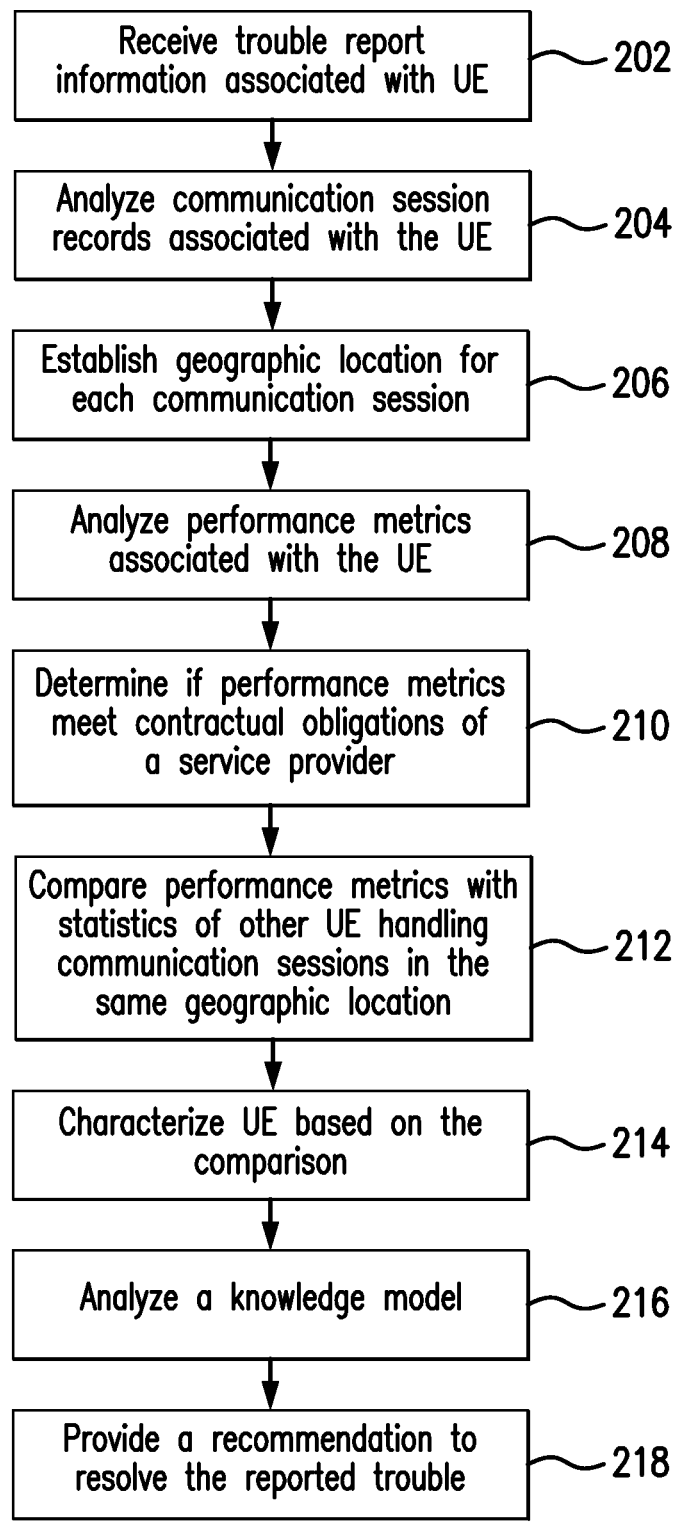
FIG. 2 is a flowchart of operational steps of a user equipment troubleshooting program of FIG. 1 in accordance with illustrative embodiments of the present invention.

FIG. 2 is a flowchart of operational steps of UET program 126 of FIG. 1, in accordance with exemplary embodiments of the present invention. Before turning to description of FIG. 2, it is noted that the flow diagram shown therein is described, by way of example, with reference to components shown in FIG. 1, although these operational steps may be carried out in any system and are not limited to the scenario shown in the aforementioned figure. Additionally, the flow diagram in FIG. 2 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

Typically, telecommunications service providers provide multimedia call centers for receiving and responding to telephone calls (or other communication messages) made by subscribers requesting repairs for telecommunications equipment and services. In a typical call center scenario, telephone calls are answered in order by customer service assistants (CSAs) who create reports of newly reported problems (i.e., trouble reports) for later referral to a technician for repair or provide status information regarding existing trouble reports. Accordingly, in one embodiment of the present invention, at 202, UET program 126 may automatically retrieve the subscriber information from corresponding trouble reports provided to troubleshooting system 124 by CSAs or automated customer service support platform. The subscriber information may also specify a UE type and an issue type, such as, but not limited to, access, retainability or QoE issues.

At 204, UET 126 may analyze signaling data, session records and call records stored in OSS database 140 and may correlate call flows for end-to-end call trace troubleshooting associated with the provided UE identification information. The session records allow analysis and troubleshooting to be performed in the units of sessions instead of individual data packets. The number of sessions is smaller than the number of data packets. Hence, operations based on the session records yield results faster than operations based on individual data packets. Each session record also has a smaller size compared to a collective set of data packets in a session. In one embodiment, call detail records (CDRs) (e.g., obtained from the originating and terminating access networks) may also be analyzed by UET 126 at step 204. CDR records contain multiple fields, including a time stamp for the start of a call, a call duration, the sender and caller phone numbers, the disposition of the call, the call type, and other call related information.

At 206, UET 126 preferably utilizes the analyzed signaling data, CDRs and/or session records to obtain geographic locations of UEs, such as mobile phones 108. The location is preferably a geographic position, such as latitude/longitude coordinates. However, the location may, alternatively, take other forms. For example, the location could be a street address and/or the name of an establishment in which the UE 108 is positioned. According to an exemplary embodiment, UET 126 may create a location summary log corresponding to a predetermined period of time for all UEs 108 in network 100 and may store the location summary log in OSS database 140. It is noted that at least in some cases time and location bounds may be specified in the trouble report received in step 202. For example, continuing with the call center scenario described above, if the calling subscriber indicates that in the last month he or she has been getting dropped calls when they are at work, UET 126 may investigate all calls for a one month period and for specified locations only. According to alternative embodiments, UET 126 may employ any of a variety of position-determining technologies to determine the locations of the UEs 108 over time. In one embodiment, the position-determining technologies may be UE-based (e.g., GPS) or network based (e.g., triangulation), both well known in the art. In other words, by reference to the generated location summary log, UET 126 may be able to determine where a particular UE 108 was located at any given time.

According to an embodiment of the present invention, at 208, UET 126 preferably analyzes and automatically correlates performance data associated with the UE identified in step 202 to determine whether the subscriber's complaint specified in the received trouble report is valid. The number and type of performance metrics that are used by UET 126 in this step may depend on the type of radio access technology that is being used in telecommunications network 100. In some embodiments, UET 126 may analyze at least one of the quality metrics, such as, but not limited to, mean Channel Quality Indicator (CQI), interference, mean throughput, delay, number of dropped calls, and coverage. For example, in the LTE and LTE-Advanced standards the CQI measures the quality of the downlink (DL) channel and is fed back from the UEs 108 to the base stations (Node Bs 106 in FIG. 1, or eNodeBs using LTE terminology). There are many interference measurement methods known in the art. In the LTE/LTE-A type of RAN 104, the interference measurement may be based on a Common Reference Signal (CRS) data, for example. Some performance characteristics, such as mean throughput may depend on the bandwidth available in both RAN and core network 102 for the desired service. In one embodiment, the mean throughput may be measured by dividing the total bytes value by total time value corresponding to the predetermined period of time, for example. Other performance characteristics, such as delay and jitter may be utilized by UET 126 to troubleshoot delay sensitive applications. Delay-sensitive traffic includes such services as VoIP, real time video, and audio. According to various embodiments, additional performance metrics utilized in step 208 may include other signal quality metrics transmitted by UEs 108 including, but not limited to: a measure of the average power received from the range of frequencies, a signal to noise ratio ("SNR") measure associated with the range, the quality measurement, the blocked and dropped call measure, measurements of data speeds or other data network metrics, the times or time periods of the data points or measures, or any combination thereof.

In addition, at 210, UET 126 may optionally determine whether the evaluated performance metrics meet contractual obligations of a telecommunications service provider. Some contractual obligations, such as quality of service guarantee, typically appear in a service level agreement and have to do with the network provider's obligations to deliver a certain level of service including such items as percentage of downtime, mean time to repair and other related performance metrics. The service level agreement also often includes definitions of credits that the service provider may issue if the specified obligations are not met as well as other recourse alternatives for the subscriber. It is contemplated that step 210 may enable UET 126 to identify requests for service beyond the communication services subscribed to by the subscribers.

At step 212, UET 126 may evaluate metrics analyzed in steps 208 and 210 relative to other subscribers who made calls at similar times and locations. In other words, UET 126 may compare performance metrics associated with the UE identified in the received trouble report with statistics of other UEs handling calls and/or communication sessions in the substantially same geographic area at substantially the same time. In one embodiment, to expedite the evaluation step UET 126 may pre-calculate aggregate performance statistics for all UE operating in a particular geographic area. For example, a per-hour map of mean throughput enables UET 126 to quickly compare a particular UE's throughput to average measurements provided by other UEs. If UET 126 determines that the performance metrics associated with the plurality of other UEs handling calls in the same area are also below predetermined benchmarks, UET 126 preferably infers that there is a very strong likelihood that the root cause of the issue reported by the subscriber is related to the telecommunications network 100 rather than UEs 108. Conversely, if the performance metrics of the UE under investigation indicate poor performance while the respective performance metrics of the plurality of other UEs handling calls and/or data sessions in the same area are within a pre-defined range indicative of normal operation, UET 126 preferably infers that there is a very strong likelihood that the UE under investigation may be defective. In one embodiment, UET 126 can utilize historical performance metrics data to determine an "average" functionality for each performance metric. Accordingly, the pre-defined range indicative of normal operation may comprise normal operational variance around the average, while measurements falling outside this range may be indicative of poor performance.

According to an embodiment of the present invention, at 214, UET 126 may automatically characterize the identified UE based on the comparison performed in step 212. In one embodiment, UET 126 may characterize the UE as either defective or good, for example. Continuing with the call center example, in one embodiment, steps 202-218 can be performed by UET 126 in real time while CSAs are handling live calls with various subscribers. UE characterization performed by UET 126 and described herein preferably facilitates quick resolution of the reported issues during such calls.

At 216, in response to determining that the reported issues are related to one or more network failures, UET 126 may perform a root cause analysis of the potential network failures using KBS 130 to provide at least one remedial recommendation. Candidate countermeasures (remedial recommendations) may be fully determined by the iterative inference process performed by KBS analyzer 134. In other words, KBS analyzer 134 may perform additional queries or analysis of accumulated knowledge model to isolate countermeasures corresponding to each of the potential network failures. In one embodiment, the knowledge model may include a plurality of inference rules predefined by various subject matter experts based on their empirical knowledge. Each of the plurality of predefined inference rules may associate at least one cause of the one or more potential network failures with at least one known remedial recommendation.

According to an embodiment of the present invention, GUI 132 of KBS 130 may comprise a framework for collecting user feedback from various users 136, such as CSAs and network technicians, with respect to the actual causes of the reported network issues and with respect to recommended countermeasures. GUI 132 may store feedback data from a plurality of users 136 in a user feedback database, which may be a storage component of KBS 130. Any user interaction with KBS 130, or application issued by KBS 130, may be included in the feedback data stored in such database. In one embodiment, at 218, for each reported issue, GUI 132 may present a list of countermeasures/corrective actions determined by UET 126 based on known network-related resolutions contained within the utilized knowledge model.

In summary, UET 126 may be a computer program or program component capable of automatically detecting a faulty behavior of UEs and capable of performing root cause analysis of the reported network-related issues in substantially non-deterministic system to provide potential countermeasures associated with the identified network-related problems based on historical user feedback, preloaded heuristics and similar learned information from various user constituents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
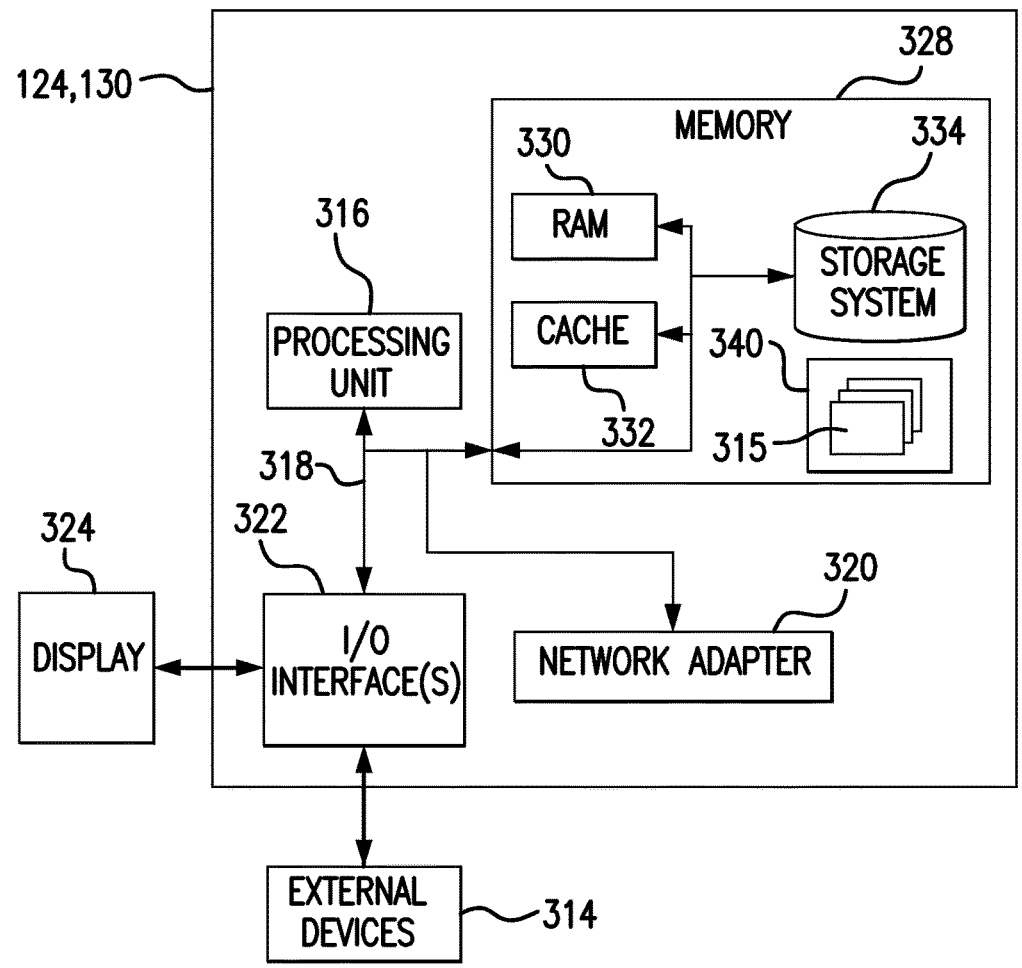
FIG. 3 illustrates internal and external components of system computers of FIG. 1 in accordance with an illustrative embodiment of the present invention.

FIG. 3 illustrates internal and external components of the troubleshooting system 124 and knowledge base system 130 servers in accordance with an illustrative embodiment. The servers 124 and 130 are only examples of a suitable server computer and are not intended to suggest any limitation as to the scope of use or functionality of embodiments of the invention described herein. Regardless, the servers 124 and 130 are capable of being implemented and/or performing any of the functionality set forth hereinabove.

The servers 124 and 130 are operational with numerous other general purpose or special purpose computing system environments or configurations. Examples of well-known computing systems, environments, and/or configurations that may be suitable for use with the servers 124 and 130 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The servers 124 and 130 may be described in the general context of computer system-executable instructions, such as program modules, being executed by a computer system. Generally, program modules may include routines, programs, objects, components, logic, data structures, and so on that perform particular tasks or implement particular abstract data types. The servers 124 and 130 may be practiced in distributed data processing environments where tasks are performed by remote processing devices that are linked through a communications network. In a distributed data processing environment, program modules may be located in both local and remote computer system storage media including memory storage devices.

The servers 124 and 130 are shown in FIG. 3 in the form of a general-purpose computing device. The components of the servers 124 and 130 may include, but are not limited to, one or more processors or processing units 316, a system memory 328, and a bus 318 that couples various system components including the system memory 328 to the processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The servers 124 and 130 typically include a variety of computer system readable media. Such media may be any available media that is accessible by the servers 124 and 130, and it includes both volatile and non-volatile media, removable and non-removable media.

The system memory 328 can include computer system readable media in the form of volatile memory, such as random access memory (RAM) 330 and/or cache memory 332. The servers 124 and 130 may further include other removable/non-removable, volatile/non-volatile computer system storage media. By way of example only, a storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As will be further depicted and described below, the memory 328 may include at least one program product having a set (e.g., at least one) of program modules that are configured to carry out the functions of embodiments of the invention.

A program/utility 340, having a set (at least one) of program modules 315, such as the UET 126, GUI 132 and KBS analyzer 134, may be stored in the memory 328 by way of example, and not limitation, as well as an operating system, one or more application programs, other program modules, and program data. Each of the operating system, one or more application programs, other program modules, and program data or some combination thereof, may include an implementation of a networking environment. Program modules 315 generally carry out the functions and/or methodologies of embodiments of the invention as described herein.

The servers 124 and 130 may also communicate with one or more external devices 314 such as a keyboard, a pointing device, a display 324, etc.; one or more devices that enable a user to interact with the servers 124 and 130; and/or any devices (e.g., network card, modem, etc.) that enable the servers 124, 130 to communicate with one or more other computing devices. Such communication can occur via Input/Output (I/O) interfaces 322. Still yet, the servers 124, 130 can communicate with one or more networks such as a local area network (LAN), a general wide area network (WAN), and/or a public network (e.g., the Internet) via a network adapter 320. As depicted, the network adapter 320 communicates with the other components of the servers 124, 130 via the bus 318. It should be understood that although not shown, other hardware and/or software components could be used in conjunction with the servers 124, 130. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for detecting a faulty behavior of a user equipment (UE) in a telecommunication network, the computer system comprising one or more processors, one or more computer-readable storage devices, and a plurality of program instructions stored on at least one of the one or more storage devices for execution by at least one of the one or more processors, the plurality of program instructions comprising:

program instructions to receive and correlate Protocol Data Units (PDU) and data packets from a Radio Access Network (RAN) and network interfaces to determine a trouble report associated with the first UE, wherein the received trouble report includes information uniquely identifying the first UE and includes indications of trouble affecting the first UE;

program instructions to establish one or more geographic locations for each communication session associated with the first UE for a predetermined period of time based on the received trouble report;

program instructions to compare one or more performance metrics associated with the first UE with one or more performance metrics associated with a plurality of UEs, wherein each of the plurality of UEs handled one or more communication sessions at the established one or more geographic locations during the predetermined period of time;

program instructions to characterize the first UE as defective responsive to a determination that the one or more performance metrics associated with the first UE indicate poor performance while the one or more performance metrics associated with the plurality of UEs fall within a pre-defined range of normal operation of UEs or characterize the first UE as unimpaired and characterize the trouble affecting the first UE as a network trouble responsive to a determination that the one or more performance metrics associated with the first UE and the one or more performance metrics associated with the plurality of UEs indicate poor performance; and program instructions to apply iterative root cause analysis of a knowledge model having a plurality of inference rules to provide a corrective action to resolve the trouble affecting the first UE.

2. The computer system of claim 1, wherein the program instructions to establish one or more geographic locations comprise program instructions to analyze a plurality of communication session records associated with each communication session.

3. The computer system of claim 1, wherein the communication session comprises a voice call, a video call, a chat session, a voice mail, a video mail, or a video stream.

4. The computer system of claim 1, wherein the one or more performance metrics comprise at least one of the following: mean Channel Quality Indicator (CQI), mean throughput, interference, delay, number of dropped calls, and coverage.

5. The computer system of claim 1, wherein the program instructions to compare one or more performance metrics associated with the first UE comprise program instructions to determine whether the one or more performance metrics meet contractual obligations of a telecommunications service provider.

6. The computer system of claim 1, wherein the program instructions to compare one or more performance metrics associated with the first UE comprise program instructions to pre-calculate aggregate performance metrics associated with the plurality of UEs.

7. The computer system of claim 1, wherein the program instructions to apply iterative root cause analysis comprise program instructions to analyze a knowledge model.

8. The computer system of claim 7, wherein the knowledge model is stored on the one or more computer-readable storage devices.

9. A computer program product for detecting a faulty behavior of a user equipment (UE) in a telecommunication network, the computer program product comprising:

one or more non-transitory computer-readable storage devices and a plurality of program instructions stored on at least one of the one or more computer-readable storage devices, the plurality of program instructions comprising:

program instructions to receive and correlate Protocol Data Units (PDU) and data packets from a Radio Access Network (RAN) and network interfaces to determine a trouble report associated with the first UE, wherein the received trouble report includes information uniquely identifying the first UE and includes indications of trouble affecting the first UE;

program instructions to establish one or more geographic locations for each communication session associated with the first UE for a predetermined period of time based on the received trouble report;

program instructions to compare one or more performance metrics associated with the first UE with one or more performance metrics associated with a plurality of UEs, wherein each of the plurality of UEs handled one or more communication sessions at the established one or more geographic locations during the predetermined period of time;

program instructions to characterize the first UE as defective responsive to a determination that the one or more performance metrics associated with the first UE indicate poor performance while the one or more performance metrics associated with the plurality of UEs fall within a pre-defined range of normal operation of UEs or characterize the first UE as unimpaired and to characterize the trouble affecting the first UE as a network trouble responsive to a determination that the one or more performance metrics associated with the first UE and the one or more performance metrics associated with the plurality of UEs indicate poor performance; and program instructions to apply iterative root cause analysis of a knowledge model having a plurality of inference rules to provide a corrective action to resolve the trouble affecting the first UE.

10. The computer program product of claim 9, wherein the program instructions to establish one or more geographic locations comprise program instructions to analyze a plurality of communication session records associated with each communication session.

11. The computer program product of claim 9, wherein the communication session comprises a voice call, a video call, a chat session, a voice mail, a video mail, or a video stream.

12. The computer program product of claim 9, wherein the one or more performance metrics comprise at least one of the following: mean Channel Quality Indicator (CQI), mean throughput, interference, delay, number of dropped calls, and coverage.

13. The computer program product of claim 9, wherein the program instructions to compare one or more performance metrics associated with the first UE comprise program instructions to determine whether the one or more performance metrics meet contractual obligations of a telecommunications service provider.

14. A computer-implemented method for detecting a faulty behavior of a user equipment (UE) in a telecommunication network, the computer-implemented method comprising:

receiving and correlating Protocol Data Units (PDU) and data packets from a Radio Access Network (RAN) and network interfaces to determine a trouble report associated with the first UE, wherein the received trouble report includes information uniquely identifying the first UE and includes indications of trouble affecting the first UE;

establishing one or more geographic locations for each communication session associated with the first UE for a predetermined period of time based on the received trouble report;

comparing, by a processor, one or more performance metrics associated with the first UE with one or more performance metrics associated with a plurality of UEs, wherein each of the plurality of UEs handled one or more communication sessions at the established one or more geographic locations during the predetermined period of time;

characterizing the first UE as defective responsive to a determination that the one or more performance metrics associated with the first UE indicate poor performance while the one or more performance metrics associated with the plurality of UEs fall within a pre-defined range of normal operation of UEs or characterizing the first UE as unimpaired and characterizing the trouble affecting the first UE as a network trouble responsive to a determination that the one or more performance metrics associated with the first UE and the one or more performance metrics associated with the plurality of UEs indicate poor performance; and applying iterative root cause analysis of a knowledge model having a plurality of inference rules to provide a corrective action to resolve the trouble affecting the first UE.

15. The computer-implemented method of claim 14, wherein the establishing one or more geographic locations comprises analyzing a plurality of communication session records associated with each communication session.

* * * * *